Feb. 17, 1970     S. HASDAY     3,495,313
DEBURRING WHEEL
Filed May 15, 1969
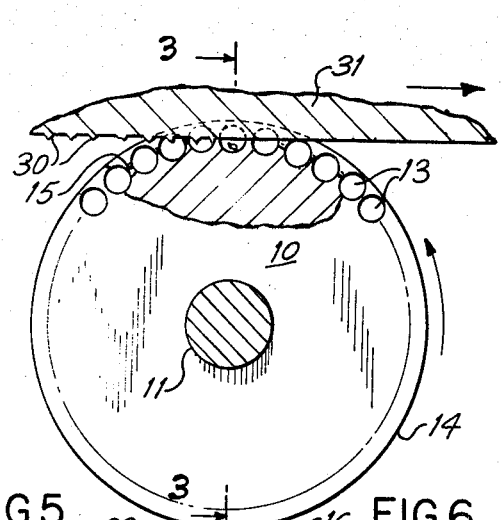
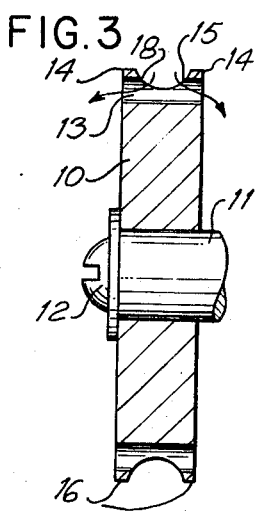
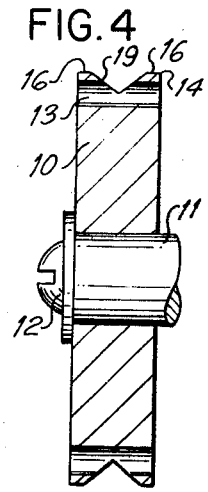
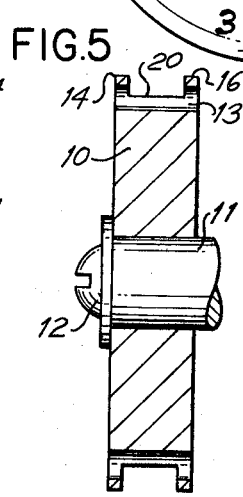
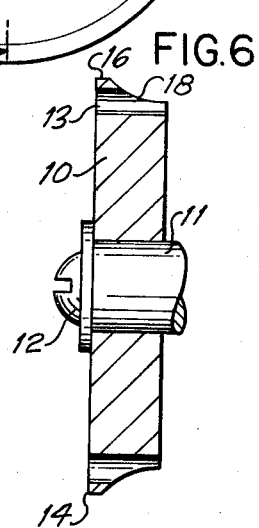
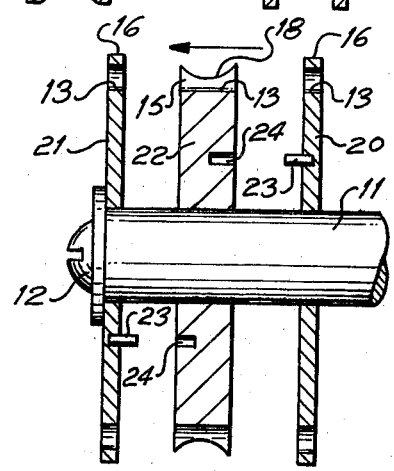

United States Patent Office 3,495,313
Patented Feb. 17, 1970

3,495,313
DEBURRING WHEEL
Solomon Hasday, 50 Sullivan Drive,
Jericho, N.Y. 11753
Filed May 15, 1969, Ser. No. 824,794
Int. Cl. B26d 1/00
U.S. Cl. 29—104                                7 Claims

ABSTRACT OF THE DISCLOSURE

This invention relates to a deburring wheel for removing burrs from cut metal edges. The wheel rim is provided with a plurality of centrally disposed channeled ridges or corrugations each channel leading to at least one aperture in a wheel side face.

---

It is an object of this invention to provide an efficient deburring wheel.

It is another object to provide a deburring wheel of simple and inexpensive design and construction.

These and other objects of this invention will become apparent upon reading the description herein of a plurality of illustrative embodiments shown in the accompanying drawing in which, FIG. 1 is a perspective view of a preferred embodiment showing a circle of centrally located ridges, the channels on either side of which lead to opposed circularly disposed apertures in the respective opposing faces of the wheel, FIG. 2 is a partial section view taken on line 2—2 of FIG. 1 to show the manner of deburring a linear metal edge by the ridges, FIG. 3 is a section view taken on line 3—3 of FIG. 2 and showing curved semi-circular ridges, FIG. 4 is a section view similar to FIG. 3 of a modification showing V-shaped ridges, FIG. 5 is a section view similar to FIG. 3 of a modification showing use of linear ridges, FIG. 6 is a section view of a modified wheel having channels leading to apertures in only one face or side of the wheel, FIG. 7 is a composite deburring wheel made of three discs, namely two similar side wall circularly apertured discs keyed to a central disc having a rim of curved ridges.

Turning to the drawing, an integral metal wheel 10 is provided with a centrally disposed shaft receiving aperture to accommodate shaft 11. The shaft 11 at its exterior end is provided with a threaded cavity to receive a flanged bolt 12 or other conventional means for securing the wheel 10 to shaft 11.

The rim of the wheel 10 is provided with a plurality of suitably spaced apart circularly disposed apertures 13 of predetermined diameter drilled transversely through the wheel in suitable space relationship to the opposed wheel edges 14.

The circular wall between the edges 14 is provided with a circular channel of predetermined configuration and of a depth to suitably bisect the drilled apertures 13 to produce ridges 15 disposed between opposing annular walls 16.

The preferred configuration of the circular rim channel is that of an arc of a circle (FIG. 3) to produce a curvilinear channel 18.

However, a V-shaped channel 19 (FIG. 4) is operable for deburring purposes. Moreover, a U-shaped circular channel 20 (FIG. 5) is also operable for specific uses.

Furthermore, as shown in FIG. 6, the wheel is operable where one side wall and its top annular surface 16 is removed, leaving but one row of circularly disposed apertures 13.

FIG. 7 illustrates the manner of making the wheel using a composite construction of three constituent parts, namely, a pair of like circularly apertured discs 20 and 21 and a central disc 22 having a curved rim 18 disposed upon a plurality of deburring ridges 15. The discs 20, 21 and 22 are keyed together by use of key pins 23 coacting with suitably located pin receiving cavities 24 so that the apertures 13 are all axially and transversely disposed in the locked together composite wheel.

As shown in FIG. 2, the burrs 30 on a linear edge of a metal sheet 31 are knocked or cut off by the action of ridges 15 of any of the annular channels 18, 19, 20 or 21. The burrs after being freed from the metal sheet 31 are flung out of the apertures 13 thereby keeping the wheel free from burrs at all times. Moreover, since the wheel is ventilated by the passage of air through the apertures 13 during the deburring process, it does not overheat and is therefore relatively cool running at all times.

As a modification of this deburring wheel, the axis of the round apertures of the side disc portions may be inclined at an angle to the plane of said disc portions and away from the direction of rotation in order to facilitate the removal of the loosed burrs from the wheel.

What is claimed is:

1. A deburring wheel comprising at least one disc portion having a plurality of spaced apart circularly disposed apertures adjacent the wheel rim and a disc portion having a plurality of ridges and disposed adjacent said apertured disc portion, said ridges each being formed by channels on either side thereof and communicating with said apertures.

2. A deburring wheel comprising a pair of similar opposed exterior disc portions, each having a plurality of spaced apart circularly disposed apertures adjacent the wheel rim and a central interior disc portion having a plurality of ridges, each being formed by channels on either side thereof and communicating with respective opposed apertures in said opposed disc portions.

3. The wheel of claim 2 wherein the central ridge rim portion is integral with said opposed side portions.

4. The wheel of claim 2 wherein the central ridge rim portion is separate from both side portions and coacting locking means provided in said central and both side portions to lock said portions together to form an integrated unit.

5. The deburring wheel of claim 3 wherein the ridges of said central portion are provided with a curved configuration.

6. The wheel of claim 3 wherein the ridges of said central portion are provided with a V-shaped configuration.

7. The wheel of claim 3 wherein the ridges of said central portion is of linear configuration.

References Cited

UNITED STATES PATENTS

| 274,860 | 3/1883 | Vivarttas | 29—104 |
| 390,982 | 10/1888 | Mower | 29—104 |
| 991,463 | 5/1911 | Steiner | 29—104 |
| 3,061,910 | 11/1962 | Chamberlain | 29—104 |

FOREIGN PATENTS

| 3,355 | 10/1873 | Great Britain. |
| 106,533 | 5/1917 | Great Britain. |

HARRISON L. HINSON, Primary Examiner